United States Patent Office 2,987,349
Patented June 6, 1961

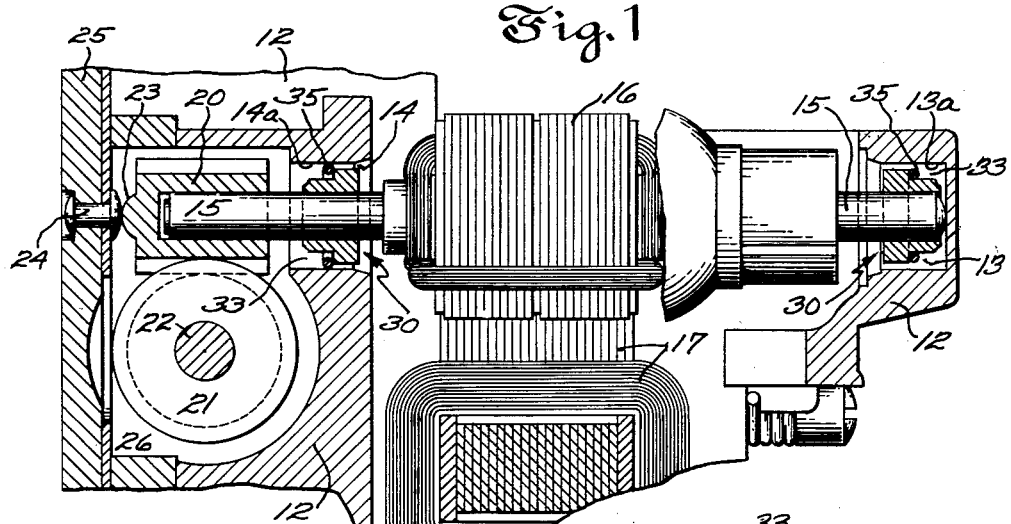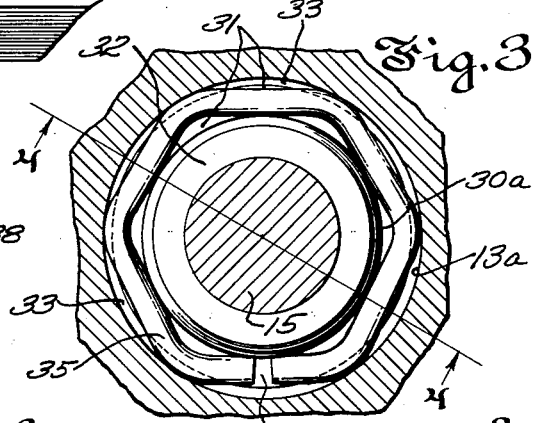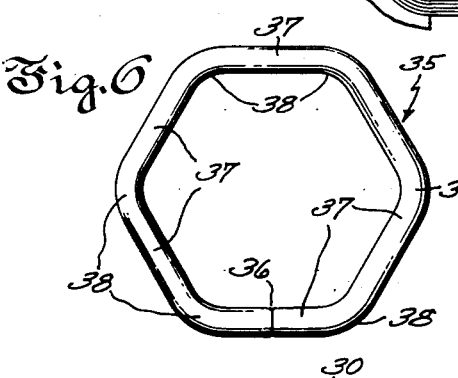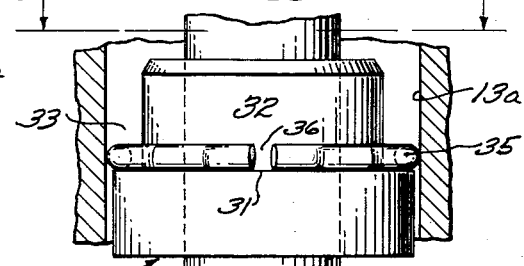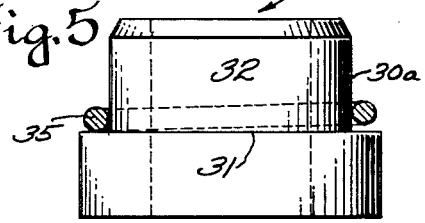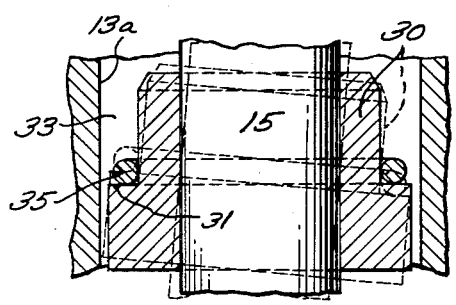

2,987,349
SELF ALIGNING BEARING
Minor G. Kretzmer, Jr., Middle Haddam, Conn., assignor to The A. C. Gilbert Company, New Haven, Conn., a corporation of Maryland
Filed July 30, 1959, Ser. No. 830,641
9 Claims. (Cl. 308—72)

This invention relates to a sleeve type of rotary bearing capable of self alignment with its journal because of resiliently yieldable mounting construction of extreme simplicity having particular advantage in mechanism for toys, as for instance when used as one or more bearings for the armature shaft of the tiny electric motors employed in toy or model electric trains.

Heretofore self aligning journal bearings have commonly restored to ball and socket constructions for making the bearing body tiltable in random directions for automatically assuming true alignment with a shaft journaled therein. In toys such ball and socket constructions have the disadvantage of being difficult and expensive to manufacture economically by mass production methods because of the precision of dimensions required. Further problems are presented by the very limited space available to accommodate the over-all size of the bearing and retention of same in the more miniature sizes of rolling stock of toy or model electric trains.

An object of the present invention is to provide a more free and dependable ability of a rigid sleeve bearing to align itself with its journal than is possible to ball and socket constructions, particularly in bearings of small size and maximum simplicity best suited for toys.

Another object is to construct a self aligning bearing from parts of a nature that permit less close tolerance in accuracy of dimensions than is required in ball and socket bearing mounts.

Another object is to provide self aligning bearing construction which frees the bearing mount from need to retain the bearing against axial thrust after being installed.

Another object is to provide a self aligning bearing that requires no manual attention to its condition of alignment when a journal is inserted therein, so that the bearing need not be accessible to inspection after being assembled in the machine in which it is used.

Another object is to form a spring cradle of the simplest possible kind for orienting and supporting a rigid sleeve type bearing body and preferably comprising a mere loop of spring wire not exceeding a full turn shaped to react as a fulcrum at any one of a plurality of circuitously spaced points about the bearing body confined to a common diametral plane such that the bearing body can tilt unopposed by said wire loop in every diametral plane.

The foregoing and other objects of the invention will become apparent from the following description of a preferred embodiment of the improvements having reference to the accompanying drawings wherein:

FIG. 1 is a view showing partially in section an installation of my improved self aligning bearing in two differing types of framework socket construction to serve as bearings for a motor shaft at opposite sides of the armature.

FIG. 2 is a view in elevation showing one of the bearings of FIG. 1 on a larger scale with only the socket containing framework shown in section.

FIG. 3 is a view taken in section on the plane 3—3 in FIG. 2 looking in the direction of the arrows.

FIG. 4 is a view taken in section on the plane 4—4 in FIG. 3 looking in the direction of the arrows, showing the bearing tilted to one of the self aligning positions it can assume universally in any diametral plane.

FIG. 5 shows a different positional relationship of bearing body to its spring wire retainer.

FIG. 6 is a detail of the spring wire retainer before it is assembled on the bearing sleeve.

In FIG. 1 portions of the frame structure of a small propulsion motor as used in toy railroad rolling stock appear at 12 and in which there is a socket 13 in the frame structure at one side of the armature 16 and another socket 14 in the frame structure at the other side of the motor armature. Each of the sockets 13 and 14 contains one of my improved self aligning bearings which receives and supports the shaft 15 of the motor armature. The stator and field windings of the motor are represented at 17. In the construction shown, motor shaft 15 carries fixed thereon a worm 20 in mesh with a worm wheel 21 whose shaft 22 is journaled in frame structure 12. End thrust for the motor shaft is afforded by anti-frictional engagement of a convex boss on the end of worm 20 with an oppositely convex stud 24 fixed in a removable cover part 25 of the frame structure which affords access to the gear box compartment 26 of the frame structure and by abutment of the other end of shaft 15 against the closed end of socket 13.

Within each of the sockets 13 and 14 by the present improvements there is provided a mounting element constituting the sole means for yieldably retaining a rigid tubular bearing body 30 possessing a convex external surface 30a and having a bore of substantial axial extent to receive and support the motor shaft 15 for rotation therein. Body 30 is preferably, but not necessarily, provided with a shoulder 31 of less diameter than the girth of socket 13 or 14 but of greater diameter than the shank portion 32 of the bearing body 30.

In keeping with the objects of the invention, namely to hold the bearing body 30 approximately central in the socket which it occupies and spaced from the inner concave socket surface 13a or 14a so that it can tilt therein in any diametral plane, there is provided a loop 35 of spring wire, bent in a variant linear course of which an example is shown in FIG. 6, for such assembly with bearing body 30 that it can make contact with each of the aforesaid concave and convex surfaces only at a plurality of points spaced along the annular space 33 between said surfaces. Such contact is of sufficiently short linear extent in the axial direction of the bearing that the straight spans 37 and the angles 38 of the loop function as a fulcrum at each point of contact with the said curved surfaces. It is preferred that the spring wire loop 35 be made discontinuous or in the manner of a split ring whose ends meet at 36 in the circuitous extent of the loop. Preferably also the spring wire 35 shall be of round cross section throughout, although other sectional shapes may be substituted so long as they do not result in appreciable extent of linear contact axially of the bearing between loop 35 and either of the surfaces 13a or 30a.

The dimensions of spring wire loop 35 are such in relation to the external girth of bearing body shank 32 and the internal girth of socket 13 or 14 that when the loop 35 is pressed onto the shank of the bearing body, as shown in FIGS. 2 and 3, it is forced to expand somewhat which slightly spreads the ends of the loop at the split 36. In this expanded condition of the loop the combined wire loop and bearing body are thrust as a unit into the socket where the expanded spring loop 35 is received with a light press fit against the concave surface 13a or 14a. This light press fit sets up flexural tension in the resilient straight spans 37 of the spring loop and/or at its angular bends 38.

While FIG. 6 shows that the spring wire loop herein chosen to illustrate the principles of the invention comprises a nearly completely circuitous spring cradle or retainer the invention may be embodied in a loop of less circuitous extent. Its continuous extent along the annular space 33 should however more than half encompass the bearing body 30. The fact that the spring wire of the loop is bent herein to such shape that it contacts the convex surface 30a of body 30 at only a plurality of circumferentially spaced points having negligible linear extent in an axial direction and likewise contacts the concave surfaces 13a and 14a of the sockets in the framework at a plurality of circumferentially spaced points having negligible linear extent in an axial direction, produces a plurality of fulcrums at and between said spaced points about which the rigid bearing body 30 can tilt in any diametral plane. A plurality of splits like that at 36, or cut through the angular corners of the loop, would suffice if there is provided a means of keeping the loop sections in coplanar alignment as by nesting the round of the spring wire at its contacting points in a circumferential groove cut in either of the surfaces 13a or 30a.

In practice, and merely as an example of the smallness of sizes in which the present invention can successfully be embodied, a loop of the hexagonal shape shown in FIG. 6 can be made by bending to such shape a round Phosphor bronze wire, 8, Nos. hard and of .020" diameter having its ends closed on an arbor of .1805" diameter. The minimum diametrical distance between its straight spans 37 may be about .1820" and the maximum diametrical distance across the outside of its angular corners 38 may be about .243". Such spring wire loop will then be thrust onto the shank 32 of the bearing body which shank may be of about .187" diameter or a few thousandths of an inch larger than the minimum innermost girth of the wire loop which therefore will be caused to spread slightly. The bevel shown on the end of the bearing body facilitates this shoving of the spring loop onto the shank 32. This spreading of the loop will result in a small increase in the overall diametral dimension of the loop when mounted on the bearing body so that if the socket 13 or 14 measures about .243" inside diameter, this expanded size of the loop mounted on the bearing body will be a light press fit within the socket setting up sufficient frictional hold to prevent the bearing from creeping along the shaft in operating service. Nevertheless the bearing body can now automatically tilt in all diametral planes to accommodate the directions of its axis to that of the shaft 15 without binding as a mere result of inserting the shaft therein and the bearing when so self aligned will maintain its position without any special attention in the assembling operation or afterward. The friction prevents rotation.

The effect of friction of the spring loop against the bearing body and the socket surface may be such as to permit self aligning displacement of the parts as shown in FIG. 4 where the loop 35 and the bearing body 30 remain in constant relationship slippage having taken place between the spring loop and the socket surface or may be as shown in FIG. 5 where the slippage has taken place between the spring loop and the bearing body or may be a composite of either kinds of slippage with always the result of leaving the bearing body free to tilt, but not rotate.

As the extreme simplicity and low cost effectiveness of a bearing constructed according to the principles of this invention will be self evident to those skilled in the art, the appended claims are directed to and intended to cover all variations of the herein illustrated sizes, shapes and arrangements of parts as come within a broad interpretation of the wording of the claims.

I claim:

1. A self aligning sleeve bearing comprising, a rigid tubular bearing body having a convex external surface and containing a bore of substantial axial extent to receive and support a journal for rotation therein, a frame structure having a socket opening of larger girth than said bearing body bounded by a concave surface of said structure providing an annular space between said body and said structure, and a mounting element constituting the sole means for retaining said bearing body in tiltable relation to and spaced diametrically from said concave socket surface comprising a single run of spring wire looped in a uniplanar course divergent from circular shape and of sufficient continuous circumferential extent along said annular space not exceeding 360 degrees to encompass at least more than half of said convex surface of said bearing body, said wire loop making contact with each of said convex and concave surfaces but only at a plurality of points in said circumferential extent spaced along said annular space and of sufficiently short linear extent in an axial direction to function as a yielding fulcrum at each of said points whereby to afford freedom for said bearing body to tilt unopposed in all diametral planes.

2. A self aligning sleeve bearing comprising, a rigid tubular bearing body having a convex external surface and containing a bore of substantial axial extent to receive and support a journal for rotation therein, frame structure having a socket opening of larger girth than said bearing body bounded by a concave surface of said structure providing an annular space between said body and said structure, and means for retaining said bearing body in tiltable relation to and spaced from said concave socket surface comprising a spring wire looped in a variant linear course confined substantially to a common diametral plane and of sufficient extent along said annular space to encompass at least more than half of said convex surface of said bearing body, said wire making contact with each of said convex and concave surfaces but only at a plurality of points spaced circumferentially along in said common plane and of sufficiently short linear extent in an axial direction to function as a yielding fulcrum at each of said points whereby to afford freedom for said bearing body to tilt in all diametral planes.

3. A self aligning sleeve bearing as defined in claim 2, in which the said variant linear course of the said looped spring wire is polygonal.

4. A self aligning sleeve bearing as defined in claim 2, in which the cross sectional shape of the said spring wire is round.

5. A self aligning sleeve bearing as defined in claim 2, in which the said variant linear course of the said looped spring wire is polygonal, and the cross sectional shape of the said spring wire is round.

6. A self aligning sleeve bearing as defined in claim 2, in which the said variant course of the said looped spring wire comprises alternate straight spans and angular corners, said straight spans contacting only the said bearing body and said corners contacting only the said concave socket surface.

7. A self aligning sleeve bearing as defined in claim 2, in which the looped extent of the said spring wire is normally of not over 360 degrees and contains at least one split therethrough, at which split said wire is discontinuous and the ends of the spring wire normally meet, and at which split said wire ends can separate to accommodate spreading of the loop of wire.

8. A self aligning sleeve bearing as defined in claim 2, in which the said looped wire courses along the said annular space in alternate straight spans and angular corners and is normally of 360 degrees circuitous extent, containing at least one split in one of said straight spans at which split said loop is discontinuous and at which split said wire ends can separate to accommodate spreading of the loop of wire.

9. A self aligning sleeve bearing as defined in claim 8, together with a cylindrical shaft journaled in the said bore of the said bearing body, and a thrust abutment stationary with the said frame structure flanking one end of the said socket in a manner to encounter an end of said journal in a manner to restrict axial movement thereof.

References Cited in the file of this patent

UNITED STATES PATENTS

| | | |
|---|---|---|
| 659,874 | Rabbeth | Oct. 16, 1900 |
| 1,384,173 | Wikander | July 12, 1921 |
| 1,862,992 | Vargha | June 14, 1932 |

FOREIGN PATENTS

| | | |
|---|---|---|
| 29,525 | Holland | Apr. 15, 1933 |